United States Patent [19]
Baker

[11] 3,739,435
[45] June 19, 1973

[54] QUICK RELEASE, TOGGLE LATCHING, SPRING CLIP FOR HOLD-OPEN PROP

[75] Inventor: Ralph F. Baker, San Diego, Calif.

[73] Assignee: Rohr Industries, Inc., Chula Vista, Calif.

[22] Filed: Apr. 17, 1972

[21] Appl. No.: 244,533

[52] U.S. Cl. .............................. 24/257 R, 248/74 R
[51] Int. Cl. .............................................. A44b 21/00
[58] Field of Search ..................... 24/248 D, 248 L, 24/81 BA, 259 C, 255 C, 257, 68 T, 70 T, 71 T, 273, 270, 255, 259; 285/365, 409, 420; 248/70, 71, 73, 74 R, 74 A, 74 B

[56] References Cited
UNITED STATES PATENTS

| 562,922 | 6/1896 | Schulze | 24/270 |
| 2,219,161 | 10/1940 | Jacobs | 285/365 |
| 3,310,264 | 3/1967 | Appleton | 248/74 R X |
| 3,313,009 | 4/1967 | Beckerer | 24/257 R |

FOREIGN PATENTS OR APPLICATIONS

| 696,084 | 8/1953 | Great Britain | 24/259 C |
| 1,092,546 | 11/1967 | Great Britain | 24/255 C |

OTHER PUBLICATIONS

Product Engineering 8/25/1958, Page 20
Camloc Fastener Corp. Model 30L

*Primary Examiner*—Donald A. Griffin
*Attorney*—George E. Pearson

[57] ABSTRACT

For retaining in stowed position a rod-like member, such as a hold-open prop for an airplane engine nacelle panel, a generally U-shape spring clip member provides for temporary retention of the prop during such time as the airplane is on the ground, and toggle latch means hingedly mounted on one leg of the clip member may be swung over to engage the other leg and securely latch the prop in the clip to insure against its accidental release during flight.

4 Claims, 5 Drawing Figures

PATENTED JUN 19 1973 3,739,435

QUICK RELEASE, TOGGLE LATCHING, SPRING CLIP FOR HOLD-OPEN PROP

BACKGROUND OF THE INVENTION

The engines of present day airplanes usually are provided with cowling and are enclosed in nacelles, both of the latter being streamlined to provide minimum attainable drag. In order to provide access to the engine and accessory equipment, access openings are provided in the cowling and nacelle, each with a closure panel, usually hingedly mounted, and with one or more hold-open props for each such panel. Ordinarily one end of each of these hold-open props is pivotally connected to the inside of its respective panel, while its other end is adapted to abut in supporting relation some solid element of the nacelle. It is customary to provide some sort of clip means to hold and retain the prop in stowed position when closing the panel preparatory to takeoff, and it is very important that the prop remains securely stowed during flight.

PURPOSE OF THE INVENTION

A primary objective of the present invention is to provide a quick release mechanism for retaining in stowed position a panel holdopen prop, which mechanism has spring clip means for temporary use while the airplane is on the ground, and toggle latch means for securing the prop in the clip means prior to takeoff to prevent accidental release of the prop during flight.

BRIEF DESCRIPTION OF THE DRAWINGS

The foregoing objectives and other advantages of the invention will be apparent from the following description and the accompanying drawings, wherein.

DETAILED DESCRIPTION OF THE DRAWINGS

Figure 1:
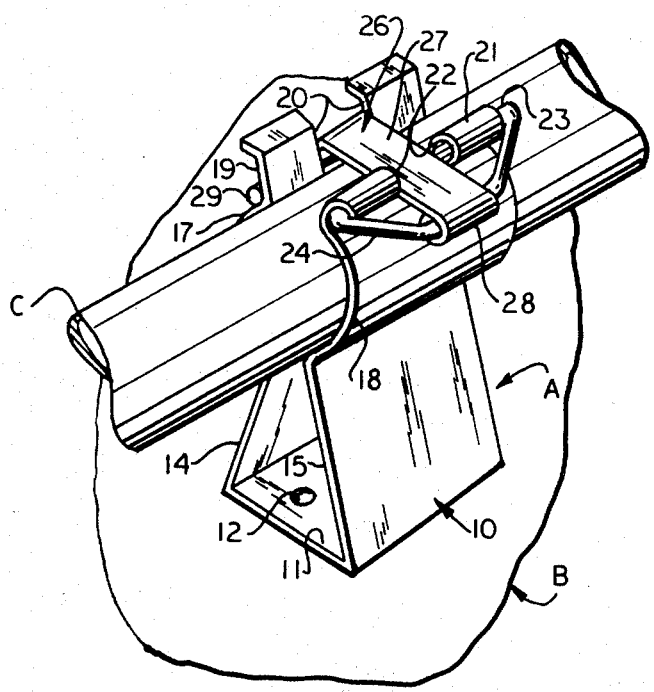
FIG. 1 is a perspective view of a toggle latching spring clip embodying the invention with a hold-open prop stowed therein, and the toggle latch means in latched position.
Figure 5:
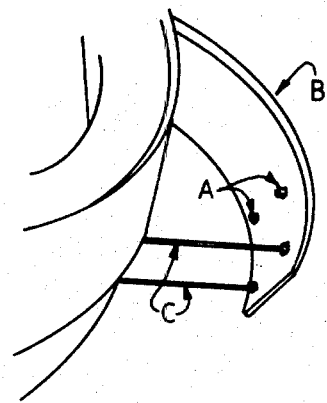
FIG. 5 is a fragmentary, perspective view in greatly reduced scale showing a portion of an airplane nacelle with two clips embodying the present invention mounted therein.

Referring to the drawings in detail, a toggle latching spring clip A embodying the present invention comprises a generally U-shape clip member 10 of springy sheet or strap material, such as, for example, a suitable grade of stainless steel or aluminum alloy, with a flat base 11. Suitable means, such as one or more holes 12, is provided in the base for mounting the spring clip 10 on a support, such as, for example, a hingedly mounted engine nacelle panel B, see FIGS. 1 and 5. While the spring clip 10 can be mounted in any position for use, it is described and claimed herein in its upright position illustrated in FIGS. 1 – 4.

From the flat base 11 two straight leg portions 14 and 15 are bent upwardly and inwardly to convergent position, and reversely bowed, integral leg portions 17 and 18 are formed on the upper ends of the converging portions 14 and 15, respectively. The bowed leg portions 17 and 18 are so shaped and spaced apart as to receive a hold-open prop C for which the clip is designed in snugly spring held position therebetween. Preferably the bowed portions 17 and 18 are curved on a shorter radius than the periphery of a hold-open prop C for which the clip is intended, so that when such prop is inserted therebetween and the clip A is not latched, as shown in broken lines in FIGS. 1 – 3, the legs of the clip have retaining spring engagement with the prop, but bow away from it slightly on each side to provide some slack to allow for toggle movement past dead center as will be apparent later herein.

Figure 2:
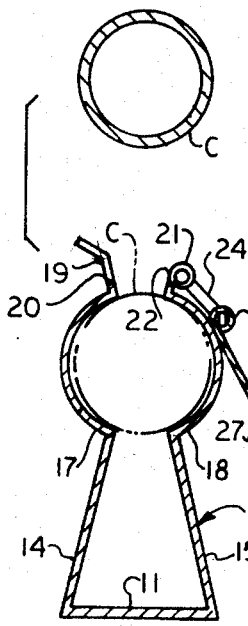
FIG. 2 is a transverse, vertical, sectional view of the clip shown in FIG. 1, a hold-open prop being also shown in position to enter the clip.

Above the bowed leg portion 17 is an integral upper leg portion 19, which extends divergently upwardly so as to cam the legs of the spring clip member 10 apart when a hold-open prop C for which the clip is designed is moved forcibly from its solid line position of FIG. 2 to its broken line position of said figure. A notch 20 is provided centrally of this upper leg extension 19 to receive toggle latch means 26 to be described later herein.

The upper end portion of the other bowed leg portion 18 is also provided with an integral upward extension 21 having a central notch 22, therein, the portions of the extension 21 on opposite sides of the notch 22 are curled, preferably outwardly as illustrated for receiving for pivotal movement the inwardly bent end portions 23 of a truncated triangular shape wire toggle element 24.

A second toggle element 27 comprises a strip of suitable sheet material, for example, such as that used for the spring clip member 10, one end 28 of which is curled around the truncated apex of the triangular wire element 24 to support the second toggle element 27 for swinging movement thereon. A straight length 29 of stiff wire, such as mild spring steel, is secured firmly within the curled other end portion of the second toggle element 27, both ends of the wire 29 extending beyond the toggle element 27 so as to engage the upper leg portion 19 on both side of notch 20 therein. The toggle element 27 is of a length to span the upper ends of the spring clip member 10 when the toggle lever 24 is in latching position, and preferably to draw these ends together slightly to remove some of the clearance between the bowed leg portions 17 and 18 as the toggle member 24 is swung past dead center between its unlatched position of FIG. 3 and its latched position of FIG. 4

A hold-open prop C for which the spring clip A is intended is of a diameter to fit snugly, in rattle-free condition, between the reversely bowed leg portions 17 and 18 with the toggle latch means 26 in any of its positions shown in FIG. 1 – 4.

OPERATION

When using the toggle latched spring clip A for temporary stowage of a hold-open prop C of known diameter while an airplane upon which the clip A is mounted is on the ground, the toggle latch means 26 may be left in its open, inoperative position of FIG. 2. In this position of the toggle latch means the prop C may be moved into spring gipped position in the spring clip member 10 by positioning the prop C between the curled end portions 28 on the bowed leg portion 18 and the diverging leg portions 19, and forcibly moving the prop C downwardly, thereby camming apart the two legs of the clip 10 and admitting the prop C to its position shown in FIG. 2 between the reversely bowed leg portions 17 and 18. There it is snugly retained by the spring bias of the clip member 10 and can easily be withdrawn when required by manually grasping the prop C and pulling it out of the spring clip member 10, the oppositely bowed leg portions 17 and 18 camming apart under the force of such pull to permit withdrawal.

Figure 3:
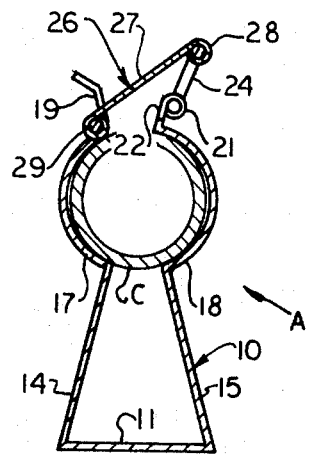
FIG. 3 is a sectional view similar to FIG. 2, but showing the toggle latch means in hooked, unlatched position.
Figure 4:
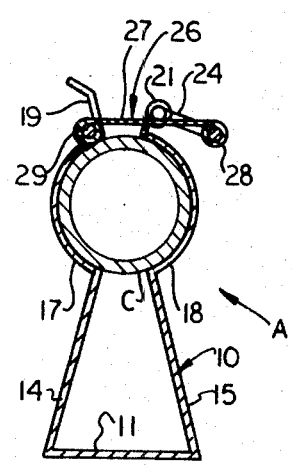
FIG. 4 is a similar sectional view with the toggle latch means in latched position.

Prior to takeoff of an airplane upon which clips embodying the invention are provided, prop C is inserted between the bowed leg portions 17 and 18 as explained previously herein, the wire toggle element 24 is swung up to its position of FIG. 3, and the other toggle element 27 is swung over as shown in the same figure to bring the projecting ends of the pin 29 into bearing engagement with the diverging upper leg portions 19 on both sides of the notch 20. The wire toggle element 24 is then swung downwardly, in clockwise direction, past dead center to its latching position of FIGS. 1 and 4. As the toggle member 24 swings downwardly toward dead center from its unstressed position of FIG. 3, the upper ends of the bowed leg portions are drawn together against the strong spring bias exerted by the bowed side portions 17 and 18, and this same bias retains the toggle latch means 26 securely against accidental release during flight. To open the toggle latch means 26 and release the hold-open prop C for removal from the spring clip 10, the foregoing procedure is reversed.

The invention provides a simple and effective retainer for a hold-open prop for aircraft cowling, and comprises a simple, easy acting spring clip for ground use which can be quickly, and easily secured by the toggle latch means against accidental release in flight.

Having thus described what is claimed as new and useful and desired to be secured by U.S. Letters Patent is:

1. A toggle latching spring clip for stowing a hold-open prop of known diameter comprising,
 a spring clip member of sheet like springy material, of general U-shape, and comprising a base and two upstanding leg portions,
 a pair of oppositely outwardly bowed portions, one in each leg portion, and spaced from the base, the bowed leg portions having a maximum separation therebetween corresponding approximately to the diameter of a hold-open prop to be fitted therebetween,
 an integral leg portion extending divergently upwardly from the upper end of one of said outwardly bowed leg portions, said extension having a toggle receiving notch therein,
 a first toggle element of stiff wire bent to define a truncated triangle, the base portion of the triangle comprising two short wire portions integral one with each side of the wire triangle and extending in line toward each other, such short wire portions terminating short of the center of the base of the triangle by an amount to admit a second toggle element therebetween, and pivotally mounted on the upper end of the other bowed leg portion,
 a second toggle element having one end thereof curled around the wire portion defining the truncated end of the triangle of the first toggle element for pivotal connection therewith, a free end portion of the second toggle element being shaped to enter the notch in the extension on said one bowed leg portion, and
 means carried by such free end portion of the second toggle element to engage said extension, the second toggle element being of a length, with the toggle lever in upswung, toggle releasing position, and with the means carried by the free end of the second toggle element in engagement with said extension, to draw the free ends of the bowed leg portions toward each other against the spring bias of the U-shape clip member when the first toggle element is swung past dead center from toggle releasing position to toggle latching position.

2. A toggle latching spring clip as claimed in claim 1 wherein the bowed side portions of the legs of the spring clip member are bowed on a shorter radius of curvature than the radius of a hold-open prop to be stowed therebetween.

3. A toggle latching spring clip as claimed in claim 1 wherein the means carried by the free end of the second toggle element is a length of stiff wire secured transversely of the free end of the second toggle element and projects laterally beyond both sides of the second toggle element for engagement with said extension on both sides of the notch therein.

4. A toggle latching spring clip as claimed in claim 1 wherein the pivotal mounting for the first toggle element comprises portions of the upper end of the other bowed leg portion on both sides of the notch therein, such portions being curled outwardly, one around each inwardly extending short base portion of the truncated triangular first toggle member to provide a pivotal support for the first toggle element.

* * * * *